United States Patent
Wu et al.

(10) Patent No.: US 12,461,427 B2
(45) Date of Patent: Nov. 4, 2025

(54) OPTICAL ELEMENT DRIVING MECHANISM

(71) Applicant: TDK TAIWAN CORP., Taoyuan (TW)

(72) Inventors: Fu-Yuan Wu, Taoyuan (TW); Sin-Jhong Song, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 0 days.

(21) Appl. No.: 18/349,515

(22) Filed: Jul. 10, 2023

(65) Prior Publication Data

US 2023/0350154 A1 Nov. 2, 2023

Related U.S. Application Data

(63) Continuation of application No. 16/779,252, filed on Jan. 31, 2020, now abandoned.
(Continued)

(30) Foreign Application Priority Data

Dec. 20, 2019 (EP) ..................................... 19218896

(51) Int. Cl.
  *G02B 7/04* (2021.01)
  *G01B 11/24* (2006.01)
  (Continued)

(52) U.S. Cl.
  CPC ................ *G03B 9/06* (2013.01); *G01B 11/24* (2013.01); *G01S 7/4813* (2013.01);
  (Continued)

(58) Field of Classification Search
  CPC .......... G02B 7/04; G02B 7/09; G02B 7/1805; G02B 7/182; G02B 13/0075; G02B 26/0816; G02B 26/085; G02B 27/0068; G02B 27/64; G02B 27/646; G02B 5/005; G02B 13/0065; G02B 27/0018;
  (Continued)

(56) References Cited

U.S. PATENT DOCUMENTS

10,951,834 B2  3/2021  Cohen et al.
2011/0176046 A1  7/2011  Hu et al.
(Continued)

*Primary Examiner* — Marin Pichler
(74) *Attorney, Agent, or Firm* — MUNCY, GEISSLER, OLDS & LOWE, P.C.

(57) ABSTRACT

An optical element driving mechanism including a fixed part, a movable part, a first driving assembly, a second driving assembly, and a magnetic-permeable element is provided. The fixed part includes a bottom. The movable part holding an optical element with an optical axis is movable relative to the fixed part. The first driving assembly includes a first magnetic element and a first coil arranged along a first direction. The second driving assembly includes a second magnetic element and a second coil arranged along the first direction. The first driving assembly and the second driving assembly drive the movable part to move relative to the fixed part along a second direction and a third direction, respectively. The first direction, the second direction, and the third direction are different. When viewed in the optical axis, the first driving assembly at least partially overlaps the second driving assembly.

20 Claims, 9 Drawing Sheets

Related U.S. Application Data (60) Provisional application No. 62/799,886, filed on Feb. 1, 2019.

(51) Int. Cl.
| | |
|---|---|
| *G01S 7/481* | (2006.01) |
| *G01S 17/42* | (2006.01) |
| *G02B 7/08* | (2021.01) |
| *G02B 7/09* | (2021.01) |
| *G02B 7/18* | (2021.01) |
| *G02B 7/182* | (2021.01) |
| *G02B 13/00* | (2006.01) |
| *G02B 26/08* | (2006.01) |
| *G02B 26/10* | (2006.01) |
| *G02B 27/00* | (2006.01) |
| *G02B 27/64* | (2006.01) |
| *G03B 5/02* | (2021.01) |
| *G03B 9/06* | (2021.01) |
| *H02K 41/035* | (2006.01) |
| *H04N 23/54* | (2023.01) |
| *H04N 23/55* | (2023.01) |
| *H04N 23/57* | (2023.01) |
| *G03B 5/06* | (2021.01) |
| *G03B 13/36* | (2021.01) |
| *G03B 30/00* | (2021.01) |
| *H04N 23/68* | (2023.01) |

(52) U.S. Cl.
CPC .......... *G01S 7/4816* (2013.01); *G01S 7/4817* (2013.01); *G01S 17/42* (2013.01); *G02B 7/04* (2013.01); *G02B 7/08* (2013.01); *G02B 7/1805* (2013.01); *G02B 7/182* (2013.01); *G02B 7/1821* (2013.01); *G02B 13/0075* (2013.01); *G02B 26/0816* (2013.01); *G02B 26/085* (2013.01); *G02B 26/101* (2013.01); *G02B 26/105* (2013.01); *G02B 27/0068* (2013.01); *G03B 5/02* (2013.01); *H02K 41/0356* (2013.01); *H04N 23/54* (2023.01); *H04N 23/55* (2023.01); *G02B 7/09* (2013.01); *G02B 27/646* (2013.01); *G03B 5/06* (2013.01); *G03B 13/36* (2013.01); *G03B 30/00* (2021.01); *G03B 2205/0015* (2013.01); *G03B 2205/0023* (2013.01); *G03B 2205/0069* (2013.01); *H02K 2201/18* (2013.01); *H04N 23/57* (2023.01); *H04N 23/687* (2023.01)

(58) Field of Classification Search
CPC .. H04N 5/2253; H04N 5/2254; H04N 5/2257; G03B 2205/0015; G03B 2205/0069; G03B 2205/0007; G03B 3/10; G03B 5/00; G03B 11/045; G03B 17/02; G03B 13/36

See application file for complete search history.

(56) References Cited

U.S. PATENT DOCUMENTS

| | | |
|---|---|---|
| 2018/0017844 A1 | 1/2018 | Yu et al. |
| 2018/0024329 A1 | 1/2018 | Goldenberg et al. |
| 2018/0332199 A1* | 11/2018 | Hu .................... G02B 13/0065 |

* cited by examiner

OPTICAL ELEMENT DRIVING MECHANISM

CROSS REFERENCE TO RELATED APPLICATIONS

The present application is a Continuation of U.S. application Ser. No. 16/779,252, filed on Jan. 31, 2020, which claims priority of U.S. Provisional Patent Application No. 62/799,886, filed on Feb. 1, 2019 and E.P. Patent Application No. 19218896.9, filed on Dec. 20, 2019, the entirety of which is incorporated by reference herein.

BACKGROUND OF THE INVENTION

Field of the Invention

The present disclosure relates to a driving mechanism, and more particularly to an optical element driving mechanism.

Description of the Related Art

As technology has developed, nowadays many electronic devices (such as tablet computers and smartphones) are equipped with the functionality of shooting images and recording video. A user may operate an electronic device to capture various images and video thanks to an optical element and an optical element driving mechanism disposed on the electronic device.

When the user uses the electronic device equipped with the optical element driving mechanism, shock or vibration may occur, which may cause the image or video to come out blurry. As the demand for higher quality in images or videos is increasing, an optical element driving mechanism that is able to achieve displacement correction and shake compensation has been developed.

BRIEF SUMMARY OF THE INVENTION

An optical element driving mechanism including a fixed part, a movable part, a first driving assembly, a second driving assembly, and a magnetic-permeable element is provided. The fixed part includes a bottom. The movable part holding an optical element with an optical axis is movable relative to the fixed part. The first driving assembly includes a first magnetic element and a first coil. The first magnetic element and the first coil are arranged along a first direction. The second driving assembly includes a second magnetic element and a second coil. The second magnetic element and the second coil are arranged along the first direction. The first driving assembly and the second driving assembly drive the movable part to move relative to the fixed part along a second direction and a third direction, respectively. The first direction, the second direction, and the third direction are different. The magnetic-permeable element includes a first portion in contact with the first magnetic element and a second portion in contact with the second coil, and the first portion and the second portion are integrally formed. The first magnetic element and the second coil are located on the same horizontal plane. When viewed in the optical axis, the first driving assembly at least partially overlaps the second driving assembly. When viewed in the third direction, neither the first driving assembly nor the second driving assembly overlaps the bottom.

BRIEF DESCRIPTION OF THE DRAWINGS

Aspects of this disclosure are best understood from the following detailed description when read with the accompanying drawings. It should be noted that, in accordance with the standard practice in the industry, various features are not drawn to scale. In fact, the dimensions of the various features may be arbitrarily increased or reduced for clarity of discussion.

DETAILED DESCRIPTION OF THE INVENTION

The following disclosure provides many different embodiments, or examples, for implementing different features of the provided subject matter. Specific examples of components and arrangements are described below to simplify this disclosure. These are, of course, merely examples and are not intended to be limiting. For example, the formation of a first feature "on" or "above" a second feature in the description that follows may include embodiments in which the first and second features are formed in direct contact, and may also include embodiments in which additional features may be formed between the first and second features, so that the first and second features may not be in direct contact. Ordinal terms such as "first", "second", etc., used in the description and in claims do not by themselves connote any priority, precedence, or order of one element over another, but are used merely as labels to distinguish one element from another element having the same name. In addition, in different examples of this disclosure, symbols or alphabets may be used repeatedly.

Furthermore, spatially relative terms, such as "above" and the like, may be used herein for ease of description to describe one element or feature's relationship to another element or feature as illustrated in figures. The spatially relative terms are intended to encompass different orientations of the device in use or operation in addition to the orientation depicted in figures. The apparatus may be otherwise oriented (rotated 90 degrees or at other orientations) and the spatially relative descriptors used herein may likewise be interpreted accordingly.

The embodiments of this disclosure are described with the drawings.

Figure 1:
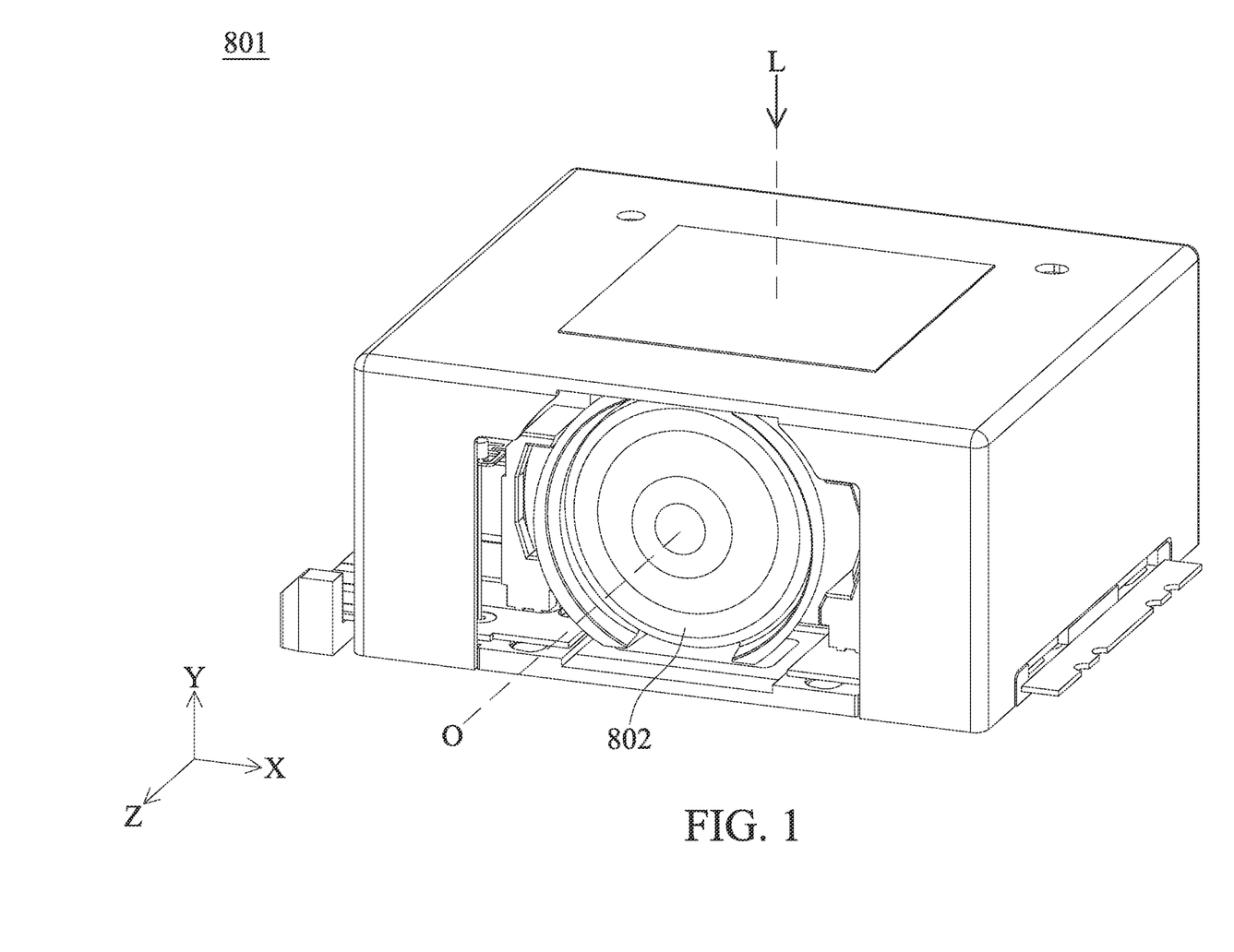
FIG. 1 is a perspective view of an optical element driving mechanism and an optical element in accordance with some embodiments of this disclosure.

FIG. 1 is a perspective view of an optical element driving mechanism 801 and an optical element 802 in accordance with some embodiments of this disclosure. The optical element 802 has an optical axis O. The optical axis O is an imaginary axis passing through the center of the optical element 802. The optical element driving mechanism 801 is a telephoto lens. Specifically, the telephoto lens means a reflecting element (not shown) is used to change the direction of a light L. When the light L outside the optical element driving mechanism 801 enters the optical element driving mechanism 801 from a first direction (Y-axis), the light L is not parallel to the optical axis O and the light L may be substantially perpendicular to the optical axis O as shown in FIG. 1. The reflecting element (not shown) may change the direction of the light L so that the light L is substantially parallel to the optical axis O. After the light L passes through the optical element driving mechanism 801, an image may be imaged on a light-detection element (not shown) (e.g. a charge-coupled detector, CCD).

The optical element driving mechanism 801 may drive the optical element 802 to move such as moving, rotating, and the like. The optical element driving mechanism 801 may drive the optical element 802 to move along a direction that is parallel to the optical axis O to achieve auto focus (AF) to focus on the scene. Additionally, the optical element driving mechanism 801 may also drive the optical element 802 to move along a direction that is not parallel to the optical axis O to achieve optical image stabilization (OIS) to compensate the deviation of the imaged image caused by shake or being impacted and solve the problem of blurry images or video. The quality of the image may be enhanced by AF and OIS.

Figure 2:
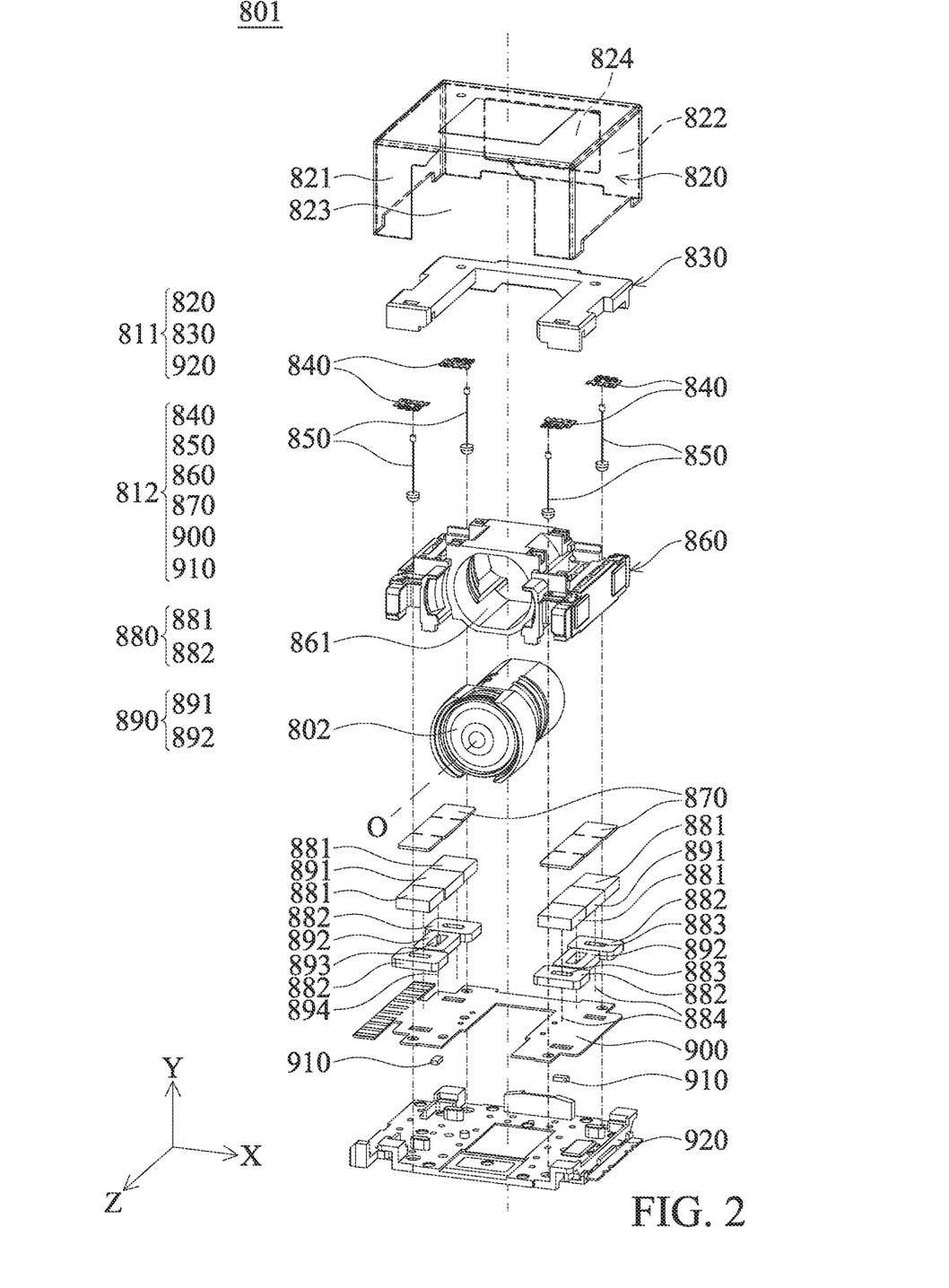
FIG. 2 is an exploded view of the optical element driving mechanism in FIG. 1.

FIG. 2 is an exploded view of the optical element driving mechanism 801 in FIG. 1. The optical element driving mechanism 801 includes a fixed part 811, a movable part 812, a first driving assembly 880, and a second driving assembly 890. The movable part 812 moves relative to the fixed part 811 and holds the optical element 802. The fixed part 811 includes a case 820, a frame 830, and a bottom 920. The movable part 812 includes four first elastic elements 840, four second elastic elements 850, a holder 860, two magnetic-permeable elements 870, a circuit assembly 900, and two sensing elements 910. The elements may be added or omitted.

The case 820 and the frame 830 are located above the bottom 920. The case 820 are connected to the bottom 920 and the space formed therein may accommodate the frame 830, the movable part 812, the first driving assembly 880, and the second driving assembly 890, and the like.

The case 820 is made of magnetic-permeable material and thus may have good magnetic retentivity, concentrate the lines of magnetic field, and the like. Magnetic materials are materials that may be magnetized when a magnetic field is applied, such as ferromagnetic material, steel (e.g. steel plate cold common, SPCC), iron/Ferrum (Fe), Nickel (Ni), Cobalt (Co), an alloy thereof. Preferably, the case 820 is made of material with high magnetic permeability.

The frame 830 may be made of non-conductive material or magnetic-permeable material such as plastic or metal alloy. When the frame 830 is made of magnetic-permeable material, the frame 830 may also have good magnetic retentivity, concentrate the lines of magnetic field, and have higher structural strength compared with non-conductive material.

The case 820 includes a sidewall 821 perpendicular to the optical axis O and another sidewall 822 opposite to the sidewall 821. An opening 823 and an opening 824 are formed on the sidewall 821 and the sidewall 822, respectively. The positions of the opening 823 and the opening 824 correspond to the optical element 802. The optical element 802 is disposed between the sidewall 821 and the sidewall 822. After the light L passes through the reflecting element (not shown), the light L enters the optical element driving mechanism 801 via the opening 823 and leaves the optical element driving mechanism 801 via the opening 824.

The first elastic elements 840 are located over the holder 860. The first elastic elements 840 include elastic material and may be made of metal. The four second elastic elements 850 are elongated. The four second elastic elements 850 connect the four elastic elements 840 of the movable part 812 and the bottom 920 of the fixed part 811, respectively. Generally, a current may be supplied to the second elastic elements 850 to make the first driving assembly 880 or the second driving assembly 890 generates an electromagnetic force. However, the circumstances that no current is supplied to the second elastic elements 850 of this disclosure are acceptable. The second elastic elements 850 may mainly function as support.

The holder 860 is disposed between the frame 830 and the bottom 920. The holder 860 has a through hole 861 for holding the optical element 802. In some embodiments, a screw and its corresponding threaded structure may be configured between the through hole 861 and the optical element 802, so that the optical element 802 may be affixed in the through hole 861. The holder 860 is spaced apart from the case 820 and the bottom 920 of the fixed part 811, i.e. the holder 860 does not directly contact the case 820 and the bottom 920.

The magnetic-permeable element 870 is made of magnetic-permeable material. Preferably, the magnetic-permeable element 870 is made of material with high magnetic permeability. The functionality of the magnetic-permeable element 870 will be described with regard to FIG. 5.

The first driving assembly 880 includes four first magnetic elements 881 and four first coils 882 corresponding to the first magnetic elements 881. Two of the first coils 881 and the other two first coils 882 are disposed on the opposite sides of the holder 860. When viewed in the first direction (Y-axis), two of the first magnetic elements 881 and the other two first magnetic elements 881 are disposed on different sides of the optical axis O, and two of the first coils 882 and the other two first coils 882 are disposed on different sides of the optical axis O. The first magnetic element 881 and the first coil 882 are arranged along the first direction (Y-axis). The first driving assembly 880 may drive the holder 860 of the movable part 812 to move along a second direction (Z-axis) relative to the bottom 920 of the fixed part 811 to achieve AF.

The second driving assembly 890 includes two second magnetic elements 891 and two second coils 892 corresponding to the second magnetic elements 891. One of the second coils 892 and the other one of the second coils 892 are disposed on the opposite sides of the holder 860. When viewed in the first direction (Y-axis), one of the second magnetic elements 891 and the other one of the second magnetic elements 891 are disposed on different sides of the optical axis O, and one of the second coils 892 and the other one of the second coils 892 are disposed on different sides of the optical axis O. Therefore, when viewed in the first direction (Y-axis), the first driving assembly 880 and the second driving assembly 890 are disposed on different sides of the optical axis O. The second magnetic elements 891 and the second coils 892 are arranged along the first direction (Y-axis) as well. The second driving assembly 890 drives the holder 860 of the movable part 812 to move along a third direction (X-axis) relative to the bottom 920 of the fixed part 811 to achieve OIS. The first direction (Y-axis), the second direction (Z-axis), and the third direction (X-axis) are different. In this embodiment, the first direction (Y-axis), the second direction (Z-axis), and the third direction (X-axis) are substantially perpendicular to each other.

The lower surface of each of the first magnetic elements 881 faces the first coils 882 and the lower surface of each of the second magnetic elements 891 faces the second coils 892. The lower surface of each of the first magnetic elements 881 is parallel to the lower surface of each of the second magnetic elements 891.

Each of the first coils 882 includes a perforation 883 and a winding axis 884. The winding axis 884 is an imaginary axis passing through the center of the perforation 883. Each of the second coils 892 includes a perforation 893 and a winding axis 894. The winding axis 894 is an imaginary axis passing through the center of the perforation 893. The winding axis 884 of the first coil 882 is parallel to the winding axis 894 of the second coil 892. When viewed in the second direction (Z-axis), the first coil 882 partially overlaps the second coil 892.

As shown in FIG. 2, each of the second magnetic elements 891 is disposed between two first magnetic elements 881, and each of the second coils 892 is disposed between two first coils 882. If one of the first magnetic elements 881 and one of the first coils 882 corresponding to each other are referred to as one first driving assembly 880, then there is more than one first driving assembly 880, and the second driving assembly 890 is disposed between the first driving assemblies 880. The first driving assemblies 880 and the second driving assembly 890 are arranged along the second direction (Z-axis). The second direction (Z-axis) is substantially parallel to the optical axis O, so the optical axis O is also substantially parallel to the arrangement direction of the first driving assemblies 880 and the second driving assembly 890.

When viewed in a direction that is parallel to the optical axis O, the first driving assembly 880 at least partially overlaps the second driving assembly 890. Compared to the configuration that the first driving assembly 880 does not overlap the second driving assembly 890, such a configuration may reduce the size of the optical element driving mechanism 801 in the first direction (Y-axis). For example, if the size of the first driving assembly 880 in the first direction (Y-axis) is a and the size of the second driving assembly 890 in the first direction (Y-axis) is b, the sum of the size of the first driving assembly 880 and the second driving assembly 890 is at least a+b when the first driving assembly 880 does not overlap the second driving assembly 890. To the contrary, if the first driving assembly 880 does overlap the second driving assembly 890 when viewed in a direction that is parallel to the optical axis O as in this disclosure, then the sum of the size of the first driving assembly 880 and the second driving assembly 890 is less than a+b.

The circuit assembly 900 is disposed on the bottom 920. The circuit assembly 900 may be a circuit board such as a flexible printed circuit (FPC), flexible-hard composite board, and the like. The circuit assembly 900 may include an electronic element (not shown) such as a capacitance, a resistor, an inductance, and the like. The first coils 882 and the second coils 892 are disposed on the circuit assembly 900.

The sensing element 910 may be a Hall sensor, a magnetoresistance effect (MR) sensor, a giant magnetoresistance effect (GMR) sensor, a tunneling magnetoresistance effect (TMR) sensor, and the like. The sensing element 910 may sense the movement condition of the holder 860 of the movable part 812 relative to the bottom 920 of the fixed part 811.

The two sensing elements 910 are disposed in the perforation 883 of one of the first coils 882 and the perforation 893 of one of the second coils 892, respectively. The sensing elements 910 are also disposed on the circuit assembly 900 because the first coils 882 and the second coils 892 are disposed on the circuit assembly 900. In this embodiment, the two sensing elements 910 may sense the movement condition of the holder 860 relative to the bottom 920 in different directions. For example, the sensing element 910 disposed in the perforation 883 of the first coil 882 may sense the movement condition of the holder 860 in the second direction (Z-axis) while the sensing element 910 disposed in the perforation 893 of the second coil 892 may sense the movement condition of the holder 860 in the third direction (X-axis).

Since the positions of the first coil 882, the second coil 892, and the sensing element 910 is pretty close to each other, the first coil 882, the second coil 892, and the sensing element 900 may be electrically connected to the circuit assembly 900 at the same time, so that the circuit is put together and thus the circuit route is simplified. That is the reason why no current flows through the second elastic element 850 of this disclosure is acceptable as described above.

Figure 3:
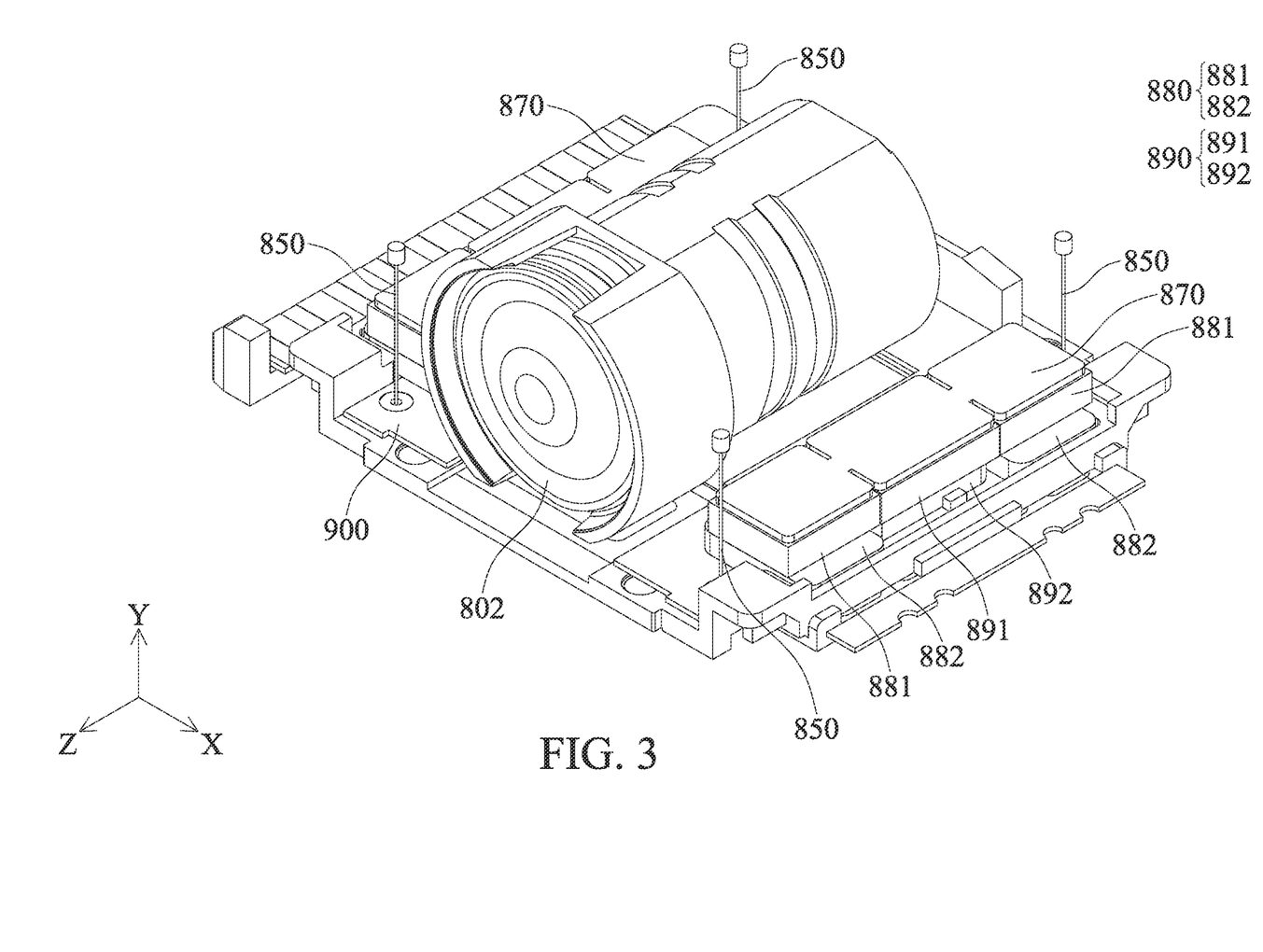
FIG. 3 is a perspective view of the optical element driving mechanism with some elements omitted.
Figure 4:
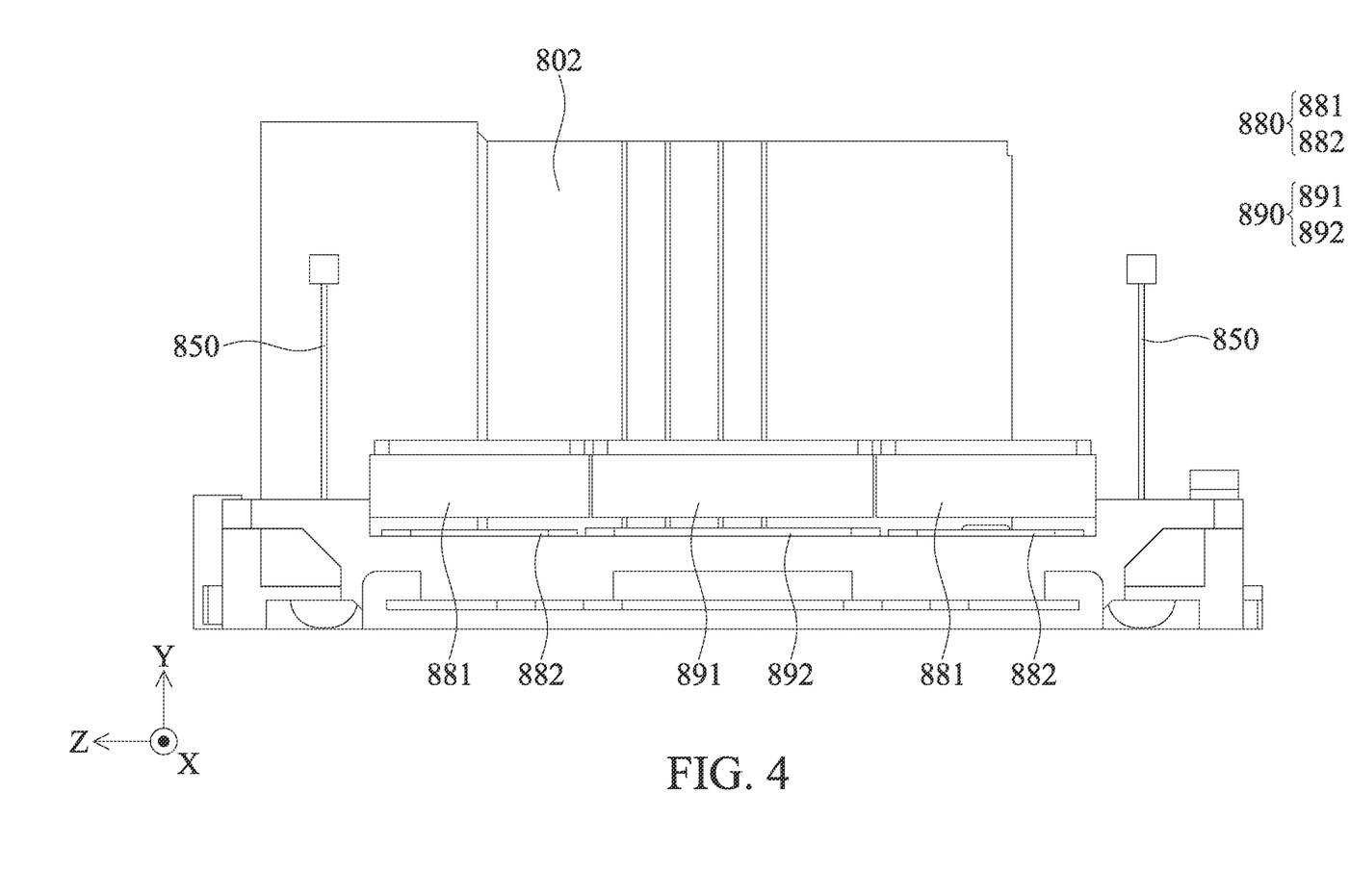
FIG. 4 is a side view of the optical element driving mechanism with some elements omitted.

Next, please refer to FIG. 3 and FIG. 4 together. FIG. 3 is a perspective view of the optical element driving mechanism 801 with some elements omitted. FIG. 4 is a side view of the optical element driving mechanism 801 with some elements omitted. As shown in FIG. 3 and FIG. 4, when viewed in the third direction (X-axis), the first driving assembly 880 at least partially overlaps the optical element 802, and the second driving assembly 890 at least partially overlaps the optical element 802 as well. Compared with configurations in which the first driving assembly 880 or the second driving assembly 890 does not overlap the optical element 802, such a configuration may reduce the size of the optical element driving mechanism 801 in the first direction (Y-axis) and achieve miniaturization of the optical element driving mechanism 801.

Figure 5:
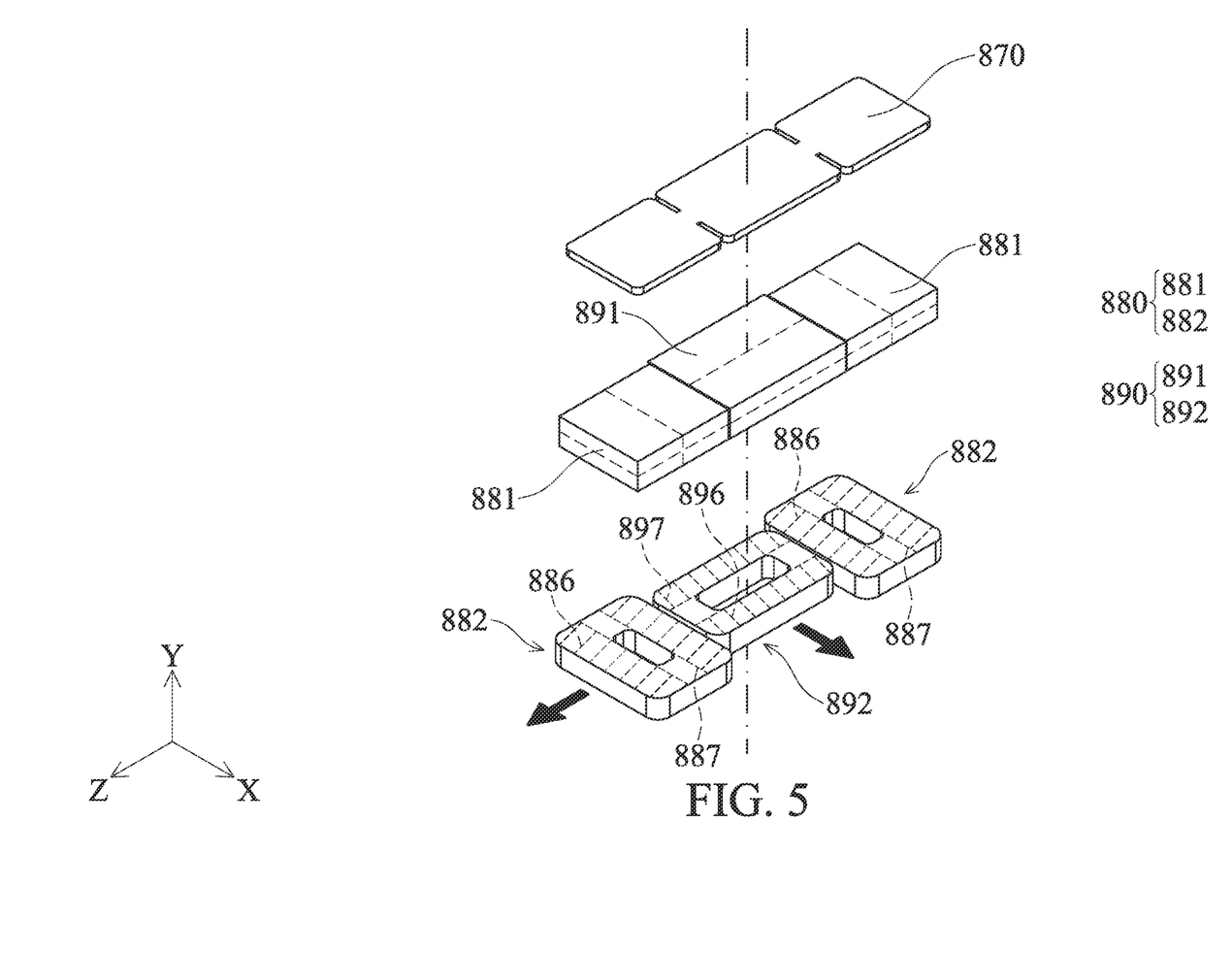
FIG. 5 is a schematic view of a magnetic-permeable element, a first driving assembly, and a second driving assembly.

FIG. 5 is a schematic view of the magnetic-permeable element 870, the first driving assembly 880, and the second driving assembly 890. The first magnetic elements 881 and the second magnetic elements 891 illustrated herein include multiple magnetic poles divided with dotted lines. The arrangement directions of the magnetic poles of the first magnetic elements 881 and the second magnetic elements 891 may be misunderstood. One may have the misperception that the magnetic poles of the first magnetic elements 881 and the second magnetic elements 891 are arranged in different, multiple directions. To avoid such misunderstandings, it should be noted that the word "the magnetic poles" used herein refer to a N-pole and S-pole pair that together generate closed lines of magnetic field.

Figure 6:
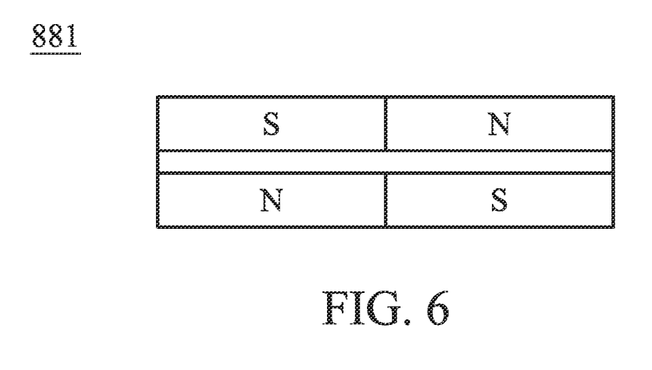
FIG. 6 and FIG. 7 are schematic views of a first magnetic element.
Figure 7:
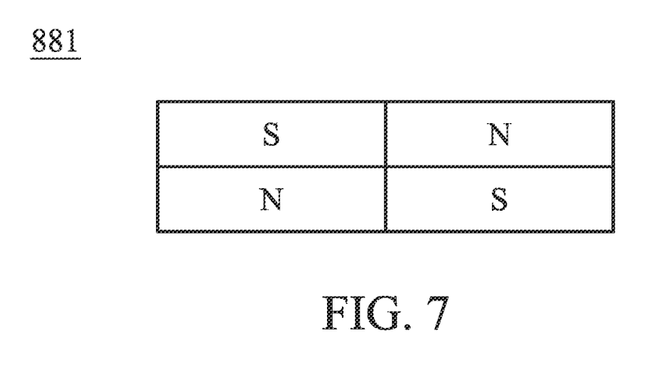

Please refer to FIG. 6 and FIG. 7 to understand the arrangement directions of the magnetic poles of the first magnetic elements 881. FIG. 6 and FIG. 7 are schematic views of any of the first magnetic elements 881 when viewed from the third direction (X-axis). The N-poles and the S-poles illustrated in FIG. 6 and FIG. 7 are exchangeable. The first magnetic element 881 may be a single multi-poles magnet (as shown in FIG. 6) or a magnet formed by gluing multiple magnets (as shown in FIG. 7). These two kinds of the first magnetic element 881 have different advantages. A single multi-poles magnet as shown in FIG. 6 is easy to be assembled, but a depletion region is formed in the middle of the multi-poles magnet during production. Magnetic force cannot be generated by the depletion region. If the first magnetic element 881 includes the depletion region, the weight of the optical element driving mechanism 801 may be increased. The magnet formed by gluing multiple magnets as shown in FIG. 7 does not have a deletion region, but additional gluing is required. It is noted that any of the second magnetic elements 891 may also be a single multipoles magnet or a magnet formed by gluing multiple magnets. It means that when viewed from the second direction (Z-axis), the magnetic poles of the second magnetic elements 891 may have similar configurations as FIG. 6 or FIG. 7.

Please refer to FIG. 5 again. The first coil 882 includes a first segment 886 and a second segment 887 parallel to the third direction (X-axis) and facing to each other. The second coil 892 includes a third segment 896 and a fourth segment 897 parallel to the second direction (Z-axis) and facing to each other. The first segment 886, the second segment 887, the third segment 896, and the fourth segment 897 are "main current regions". Main current regions are regions that the current passing through may generate electromagnetic driving force. Therefore, the electromagnetic driving force generated by the current passing through the first segment 886, the second segment 887, the third segment 896, and the fourth segment 897 together with the first magnetic elements 881 and the second magnetic elements 891 may drive the holder 860 to move. The electromagnetic force generated by the regions that do not belong to "main current regions" (not labeled in inclined lines) is weaker, and thus it is more difficult for such electromagnetic force to drive the holder 860 to move.

The direction of the current flowing through the first segment 886 is opposite to that of the current flowing through the second segment 887. To make the whole first coil 882 move toward the same direction, the direction of the magnetic field corresponding the first segment 886 and the direction of the magnetic field corresponding to the second segment 887 have to be opposite as well, which may be derived from the right-hand rule (the rule describing the relationship of the current, the magnetic field, and the electromagnetic force). Therefore, the pole of the first magnetic element 881 corresponding to the first segment 886 is different than the pole of the first magnetic element 881 corresponding to the second segment 887. Similarly, the direction of the current flowing through the third segment 896 is opposite to the direction of the current flowing through the fourth segment 897, so the pole of the second magnetic element 891 corresponding to the third segment 896 is different than the pole of the second magnetic element 891 corresponding to the fourth segment 897.

The main current regions need to correspond to as much area of the poles as possible for generating as strong electromagnetic driving force as possible. Therefore, the arrangement direction of the magnetic poles of the first magnetic element 881 is the same as the arrangement direction of the first segment 886 and the second segment 887. Additionally, the arrangement direction of the magnetic poles of the second magnetic element 891 is the same as the arrangement direction of the third segment 896 and the fourth segment 897. Therefore, the magnetic poles of the first magnetic element 881 are arranged along the second direction (Z-axis), and the magnetic poles of the second magnetic element 891 are arranged along the third direction (X-axis).

In addition, for clarity of illustration, an arrow is used to indicate the direction of the electromagnetic driving force. The flow direction of the current may be clockwise or counterclockwise. When the current flows through the first coil 882, the direction of the generated electromagnetic driving force between the main current regions (the first segment 886 and the second segment 887) and the first magnetic element 881 is in the second direction (including +Z-axis and —Z-axis, only +Z-axis is shown in FIG. 5), so the holder 860 may be driven to move along the second direction (Z-axis).

When the current flows through the second coil 892, the direction of the generated electromagnetic driving force between the main current regions (the third segment 896 and the fourth segment 897) and the second magnetic element 891 is in the third direction (including +X-axis and —X-axis, only +X-axis is shown in FIG. 5), so the holder 860 may be driven to move along the third direction (X-axis).

The shape profile of the magnetic-permeable element 870 is designed to correspond to the shape profile of the first magnetic element 881 and the second magnetic element 891. The magnetic-permeable element 870 may be integrally formed to simplify the gluing process. One magnetic-permeable element 870 is connected to two first magnetic elements 881 and one second magnetic element 891 at the same time. For example, for gluing one magnetic-permeable element 870 that is integrally formed to two first magnetic elements 881 and one second magnetic element 891, the gluing process only has to be done once. If the magnetic-permeable element 870 is not integrally formed, then the gluing process of connecting the magnetic-permeable element 870 to two first magnetic elements 881 and one second magnetic element 891 has to be done several times. Thus, the magnetic-permeable element 870 that is integrally formed may simply the production process.

Furthermore, the volume of the first magnetic element 881 and the second magnetic element 891 may be small. If two first magnetic elements 881 and one second magnetic element 891 that are small are glued to one magnetic-permeable 870, then a group of elements with larger volume is formed, which is advantageous for the consequent assembling.

When viewed in the first direction (Y-axis), the magnetic-permeable element 870, the first driving assembly 880, and the second driving assembly 890 partially overlap. Since the magnetic-permeable element 870 is placed close to the first magnetic element 881 and the second magnetic element 891, the magnetic-permeable element 870 may attract and concentrate the lines of magnetic field of the first magnetic element 881 and the second magnetic element 891 to enhance the generated magnetic force.

Figure 8:
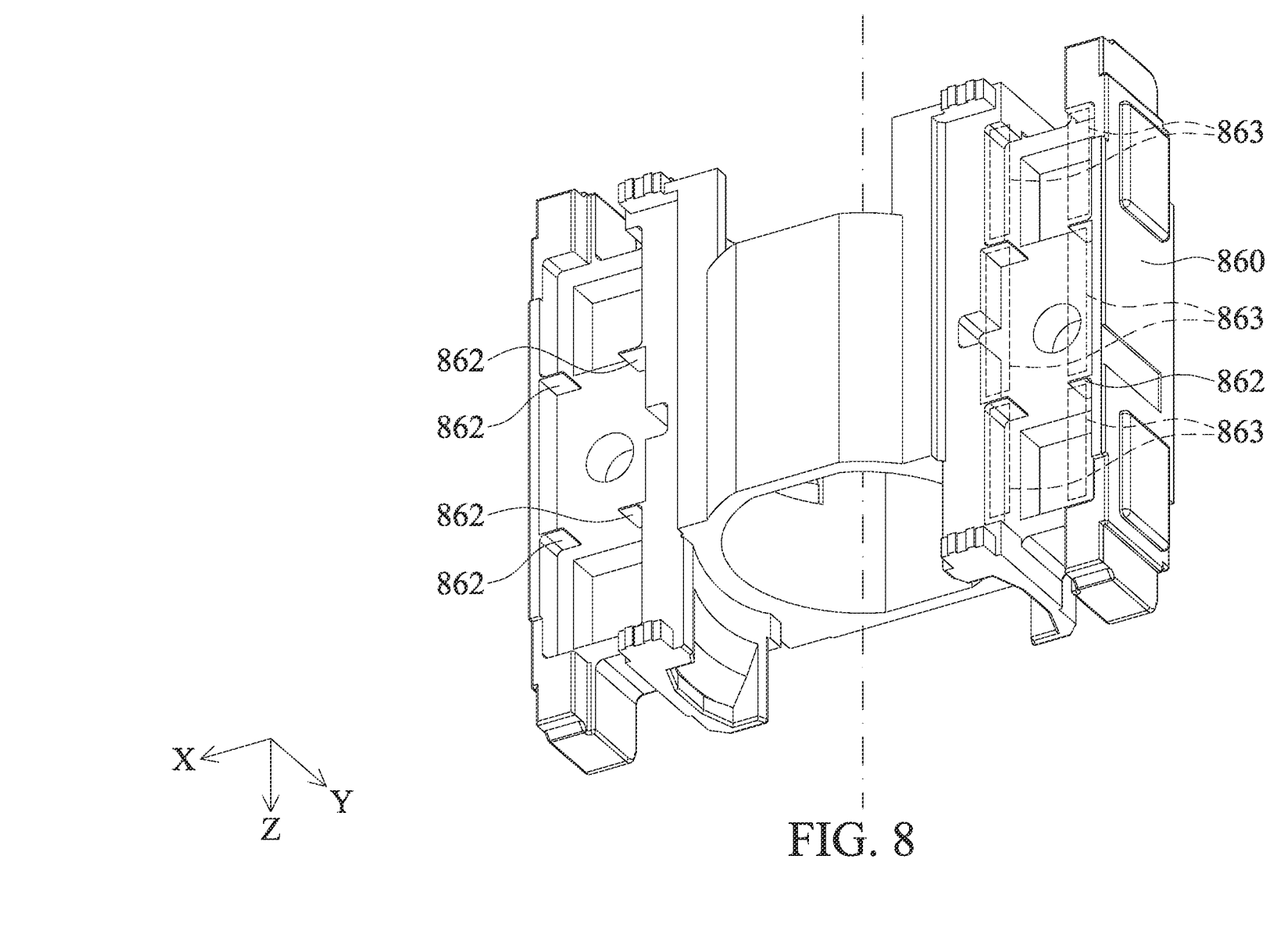
FIG. 8 is a perspective view of a holder illustrated from a different perspective than FIG. 1.

FIG. 8 is a perspective view of the holder 860 illustrated from a different perspective than FIG. 1. The side of the holder 860 that is close to the bottom 920 includes a plurality of protrusions 862 and a plurality of recesses 863. The holder 860 may be made of plastic, but plastic material deforms easily during the formation because of reasons such as thermal expansion and contraction. To avoid the magnetic-permeable element 870 cannot be received in the holder 860 because of the deformation of the holder 860, the protrusions 862 of the holder 860 may be engaged with the magnetic-permeable element 870. The protrusions 862 of the holder 860 are flakes. The recesses 863 of the holder 860 receive the magnetic-permeable element 870.

Figure 9:
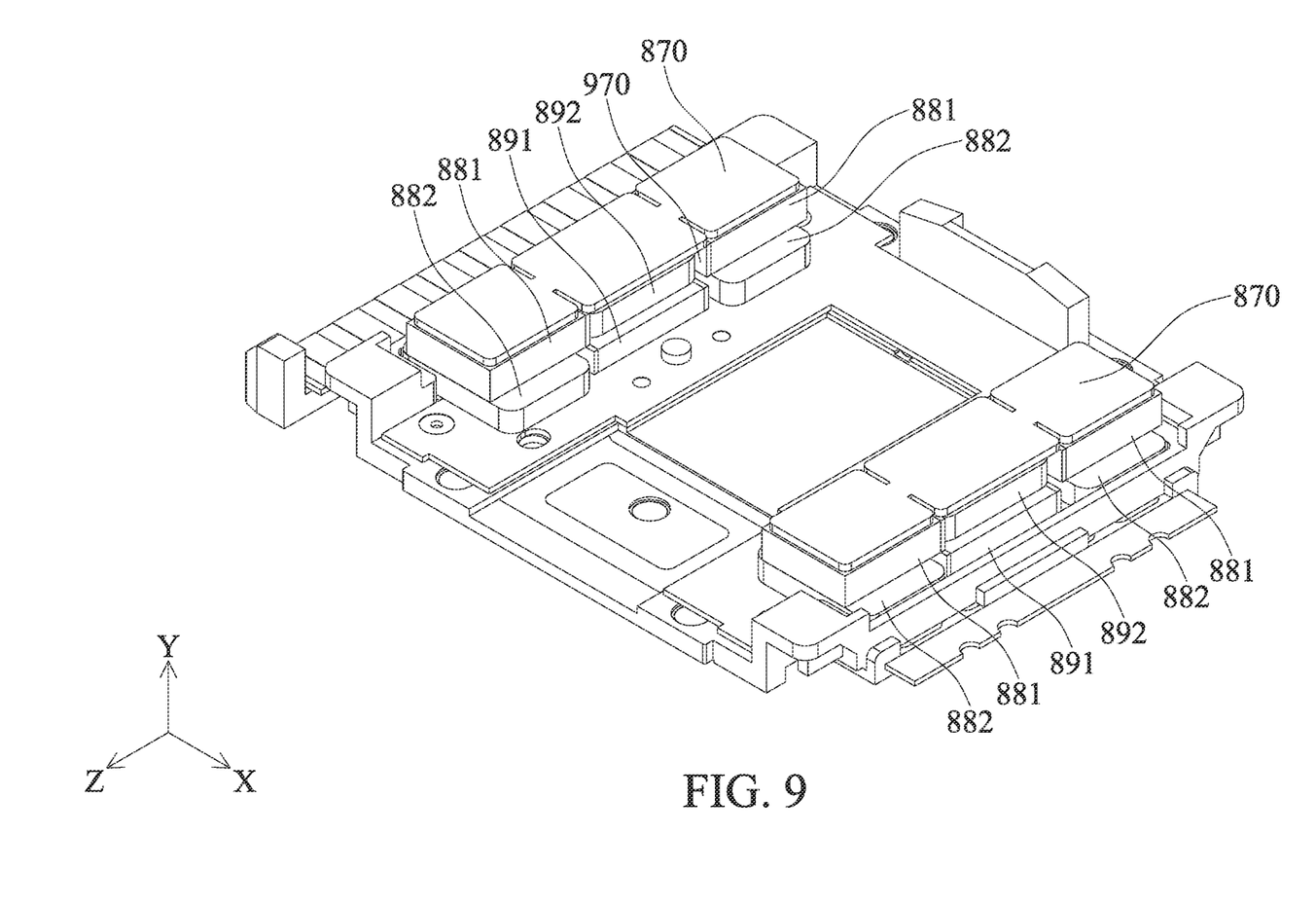
FIG. 9 is a configuration of the first driving assembly and the second driving assembly in accordance with some other embodiments of this disclosure.
Figure 10:
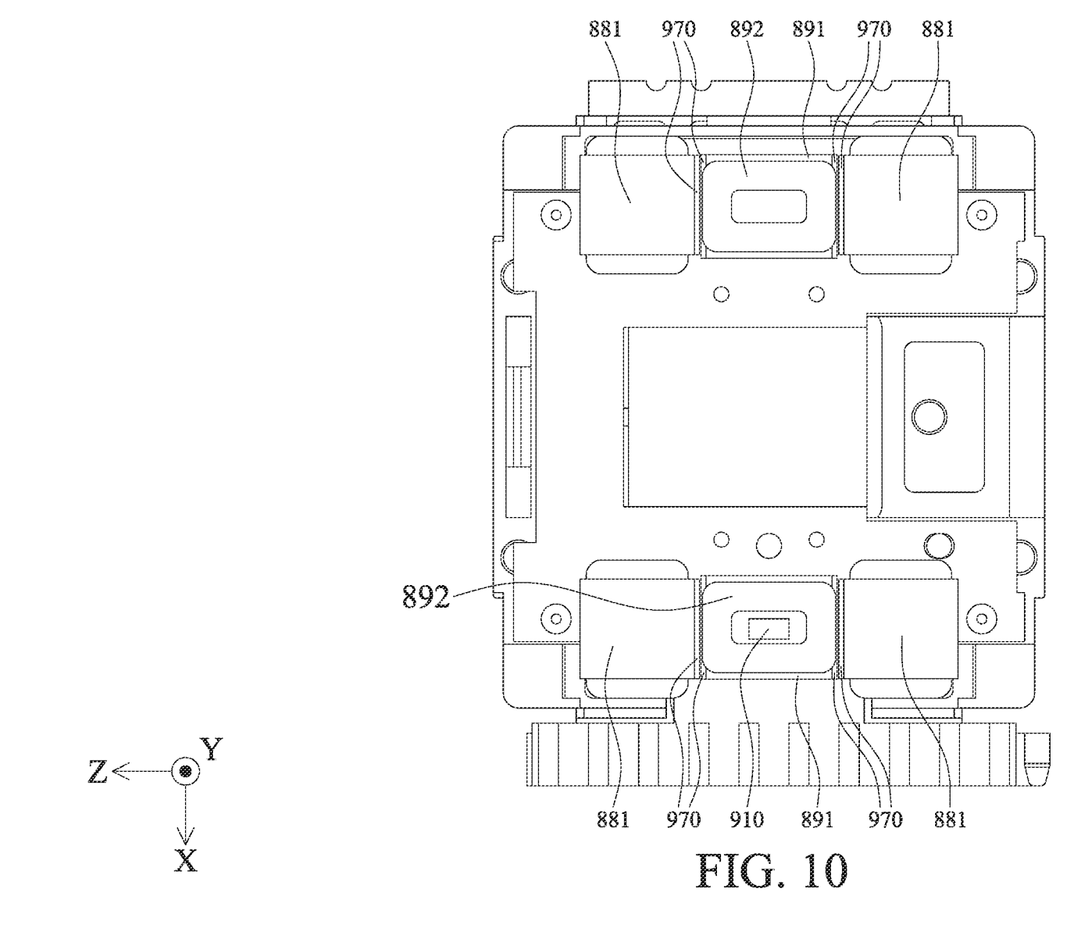
FIG. 10 is a top view of the first driving assembly and the second driving assembly in FIG. 9.

FIG. 9 is a configuration of the first driving assembly 880 and the second driving assembly 890 in accordance with some other embodiments of this disclosure. FIG. 10 is a top view of the first driving assembly 880 and the second driving assembly 890 in FIG. 9. In the following text, the same elements are denoted by the same symbols, similar elements are denoted by similar symbols, and the same contents are not repeated again.

In this embodiment, the positions of the second magnetic elements 891 of the second driving assembly 890 are exchanged with the positions of the second coils 892 of the second driving assembly 890, so that the second coils 892 are located over the second magnetic elements 891. The bottom surface of each of the first magnetic elements 881 faces the first coils 882, and the top surface of each of the second magnetic elements 891 faces the second coils 892. Additionally, the bottom surface of each of the first magnetic elements 881 and the top surface of each of the second magnetic elements 891 face different directions.

To avoid magnetic interference generated between the first magnetic elements 881 and the second coils 892 or between the second magnetic elements 891 and the first coils 882, four additional magnetic-permeable elements 970 are provided. The four magnetic-permeable elements 970 are disposed between the first driving assembly 880 and the second driving assembly 890. Therefore, when viewed in the second direction (Z-axis), the first driving assembly 880, the second driving assembly 890, and the magnetic-permeable elements 970 partially overlap.

As described above, an optical element driving mechanism is provided. Base on this disclosure, miniaturization of the optical element driving mechanism may be achieved by the arrangement and the configuration of the first driving assembly and the second driving assembly. Additionally, the displacement correction and the displacement compensation may be achieved by the first driving assembly and the second driving assembly.

The foregoing outlines features of several embodiments so that those skilled in the art may better understand the aspects of this disclosure. Those skilled in the art should appreciate that they may readily use this disclosure as a basis for designing or modifying other processes and structures for carrying out the same purposes and/or achieving the same advantages of the embodiments introduced herein. Those skilled in the art should also realize that such equivalent constructions do not depart from the spirit and scope of this disclosure, and that they may make various changes, substitutions, and alterations herein without departing from the spirit and scope of this disclosure. In addition, the scope of this disclosure is not limited to the specific embodiments described in the specification, and each claim constitutes a separate embodiment, and the combination of various claims and embodiments are within the scope of the disclosure.

What is claimed is:

1. An optical element driving mechanism, comprising:
a fixed part comprising a bottom;
a movable part movable relative to the fixed part, holding an optical element with an optical axis;
a first driving assembly, comprising:
at least two first magnetic elements; and
at least two first coils, wherein one of the at least two first magnetic elements and one of the at least two first coils are arranged along a first direction, the at least two first magnetic elements are arranged along a second direction, the at least two first coils are also arranged along the second direction, and the first driving assembly drives the movable part to move relative to the fixed part along the second direction;
a second driving assembly, comprising:
a second magnetic element; and
a second coil, wherein the second magnetic element and the second coil are arranged along the first direction, the second driving assembly drives the movable part to move relative to the fixed part along a third direction, and the first direction, the second direction, and the third direction are different; and
a magnetic-permeable element comprising a first portion corresponding to the first driving assembly and a second portion corresponding to the second driving assembly, and both the first portion and the second portion are parallel to the optical axis,
wherein when viewed in the optical axis, the first driving assembly at least partially overlaps the second driving assembly,
wherein when viewed in the second direction, the bottom is disposed below the first driving assembly and the second driving assembly, and
wherein the second magnetic element or the second coil is sandwiched between the at least two first magnetic elements that are spaced apart in the second direction, or between the at least two first coils that are spaced apart in the second direction.

2. The optical element driving mechanism as claimed in claim 1, wherein the first direction, the second direction, and the third direction are substantially perpendicular to each other.

3. The optical element driving mechanism as claimed in claim 1, wherein when viewed in the second direction, the first driving assembly at least partially overlaps the second driving assembly.

4. The optical element driving mechanism as claimed in claim 1, wherein when viewed in the third direction, the first driving assembly and the second driving assembly at least partially overlap the optical element.

5. The optical element driving mechanism as claimed in claim 1, wherein the first driving assembly and the second driving assembly are arranged along the second direction.

6. The optical element driving mechanism as claimed in claim 1, wherein the optical axis is substantially parallel to an arrangement direction of the first driving assembly and the second driving assembly.

7. The optical element driving mechanism as claimed in claim 1, wherein magnetic poles of each of the at least two first magnetic elements are arranged along the second direction and magnetic poles of the second magnetic element are arranged along the third direction.

8. The optical element driving mechanism as claimed in claim 1, wherein a winding axis of each of the at least two first coils is parallel to a winding axis of the second coil.

9. The optical element driving mechanism as claimed in claim 1, wherein each of the at least two first magnetic elements comprises a first surface facing a corresponding one of the at least two first coils, the second magnetic element comprises a second surface facing the second coil, and the first surface is parallel to the second surface.

10. The optical element driving mechanism as claimed in claim 9, wherein the first surface and the second surface face different directions.

11. The optical element driving mechanism as claimed in claim 1, wherein the movable part comprises a holder for holding the optical element, and the holder comprises a recess for receiving the magnetic-permeable element.

12. The optical element driving mechanism as claimed in claim 11, wherein the holder further comprises a plurality of protrusions formed in the recess, and the magnetic-permeable element comprises a plurality of indented areas fit into the protrusions of the holder.

13. The optical element driving mechanism as claimed in claim 12, wherein the recess is formed on a lower side of the holder that faces the bottom.

14. The optical element driving mechanism as claimed in claim 12, wherein each of the protrusions of the holder is located between the first portion of the magnetic-permeable element and the second portion of the magnetic-permeable element.

15. The optical element driving mechanism as claimed in claim 12, wherein the protrusions of the holder exhibit pairwise symmetry.

16. The optical element driving mechanism as claimed in claim 1, wherein there are more than one first driving assembly and more than one second driving assembly, and when viewed in the first direction, the first driving assemblies and the second driving assemblies are located on different sides of the optical axis.

17. The optical element driving mechanism as claimed in claim 1, further comprising a circuit assembly and a plurality of sensing elements disposed on the circuit assembly, wherein the sensing elements sense a movement condition of the movable part relative to the fixed part in different directions.

18. The optical element driving mechanism as claimed in claim 17, wherein the sensing elements are disposed on a perforation of each of the at least two first coils and/or a perforation of the second coil.

19. The optical element driving mechanism as claimed in claim 1, further comprising a U-shaped circuit assembly disposed on the bottom, wherein the at least two first coils are disposed on the U-shaped circuit assembly.

20. The optical element driving mechanism as claimed in claim 1, wherein when viewed in the optical axis, the magnetic-permeable element does not overlap the at least two first magnetic elements and the second magnetic element.

\* \* \* \* \*